United States Patent [19]

Beckman et al.

[11] Patent Number: 4,951,715
[45] Date of Patent: Aug. 28, 1990

[54] TENSION SLEEVE SUPPORTED CASING ARTICLE

[75] Inventors: John H. Beckman, Downers Grove; George H. Mahoney, Country Club Hills; Arthur L. Sheridan, Woodridge, all of Ill.

[73] Assignee: Viskase Corporation, Chicago, Ill.

[21] Appl. No.: 380,709

[22] Filed: Jul. 13, 1989

Related U.S. Application Data

[63] Continuation of Ser. No. 561,986, Dec. 16, 1983, abandoned, which is a continuation of Ser. No. 273,180, Jun. 12, 1981, abandoned.

[51] Int. Cl.$^5$ .............................................. F16L 11/12
[52] U.S. Cl. .................................. 138/118.1; 138/109; 17/1 R; 17/33; 17/41
[58] Field of Search .................... 138/118, 118.1, 121, 138/122, 177, 173, 178, 109; 17/1 R, 33, 41, 42, 35, 49

[56] References Cited

U.S. PATENT DOCUMENTS

| Re. 30,390 | 9/1980 | Kupcikevicius et al. | |
| 2,001,461 | 5/1935 | Hewitt | 17/45 |
| 3,826,852 | 7/1974 | Levaco et al. | 426/132 |
| 4,202,075 | 5/1980 | Michel et al. | 17/41 |
| 4,292,711 | 10/1981 | Becker | 17/49 |
| 4,321,728 | 3/1982 | Marz | 17/41 |
| 4,335,488 | 6/1982 | Becker | 17/33 |
| 4,437,209 | 3/1984 | Duroyon | 17/33 |
| 4,439,890 | 4/1984 | Kazaitis | 17/41 |
| 4,734,956 | 4/1988 | Frey et al. | 17/33 |

FOREIGN PATENT DOCUMENTS

| 454765 | 3/1949 | Canada . |
| 1167377 | 10/1969 | United Kingdom . |
| 1241210 | 8/1971 | United Kingdom . |

Primary Examiner—James E. Bryant, III
Attorney, Agent, or Firm—Roger Aceto

[57] ABSTRACT

Flexible tubular synthetic food casing shirred and compressed onto a rigid hollow tension sleeve core to a high packing efficiency to produce a combination casing stick tension sleeve article with provision on the tension sleeve to connect to a slacker mechanism on a stuffing apparatus.

5 Claims, 5 Drawing Sheets

U.S. Patent  Aug. 28, 1990  4,951,715
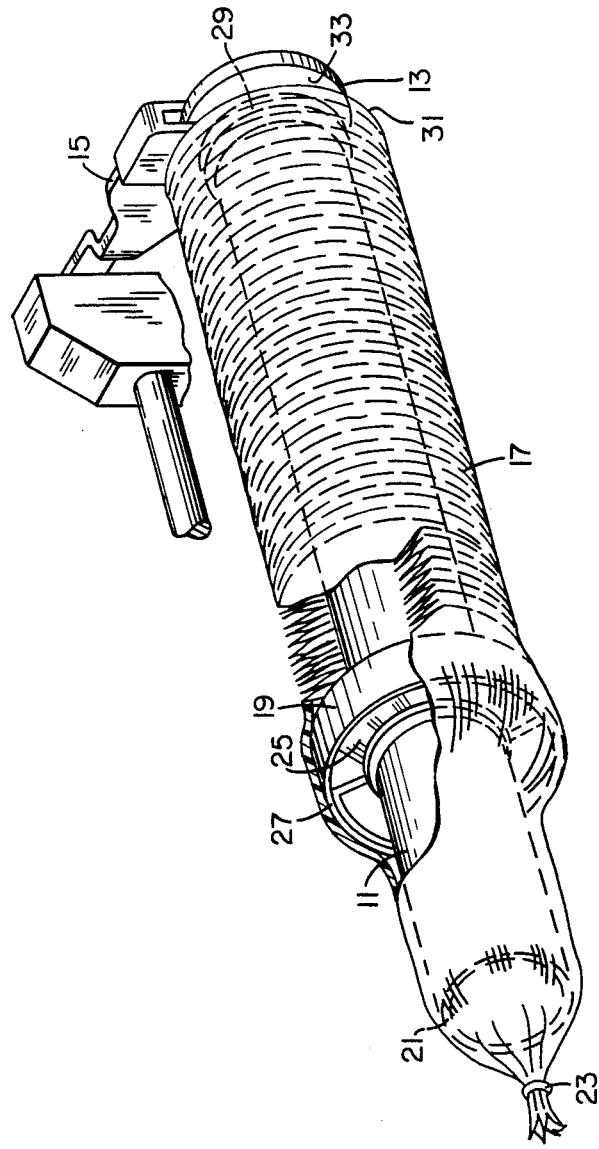

TENSION SLEEVE SUPPORTED CASING ARTICLE

This application is a continuation of prior U.S. application 561,986 Dec. 16, 1983, now abandoned, and/which is a continuation of application 273,180 June 12, 1981 now abandoned.

INTRODUCTION

This invention relates to synthetic food casings, more particularly to controllably moisturized shirred cellulosic food casing compactedly mounted on rigid hollow tubular core tension sleeves to a high compaction condition to produce high packing efficiency shirred casing stick tension sleeve articles which have significantly additional stuffable length in each stick, improved structural stability and strength, and wherein the tension sleeve core on which the casing is carried is provided with a flanged or shouldered flange end portion adapted to connect to a slacker mechanism on a stuffing machine and with a sizing means, usually a disc, to facilitate holdback control during the stuffing operation. The invention is particularly useful in the food industry for the manufacture of sausage products of the so-called chub sizes and larger sizes, wherein the process involves a step of slackening the casing to perform the clip closure operation. Casings in the present invention may advantageously be provided with protective antimycotic treatments such as chloride salts, particularly sodium chloride.

TYPES OF CASINGS

Artificial food casings used throughout the world in processing a great variety of meat and other food products, such as sausages of various types, cheese rolls, turkey rolls, and the like are customarily prepared from regenerated cellulose and other cellulosic materials. Casings are of several different types and sizes to accommodate the different categories of food product to be prepared and are provided in supported or unsupported form, the supported casings, commonly referred to as "fibrous casings", having a fibrous support web embedded in the casing wall.

A common feature of many processed food products, particularly meat products, is that the mixture of comestible ingredients, commonly called an "emulsion", is stuffed into a casing under pressure and processing of the food product is carried out after its encasement. The food product may also be toreo and shipped while encased in the casing, though in many instances, and particularly with small sausage products such as frankfurters, the casing is removed from the food product after completion of the processing.

The designation "small food casings" refers generally to those casings employed in the preparation of small size sausage products such as frankfurters. As the name suggests, this type of food casing is small in stuffed diameter, generally having a diameter within the range of from about 15 mm to about 40 mm, and is most usually supplied as thin-walled tubes of very great length. For convenience in handling, these casings, which may be 20 to 50 meters in length or even longer, are shirred and compressed to produce what is commonly referred to as "shirred casing sticks" of from about 20 cm to about 60 cm in length. Shirring machines and the products thereof are shown in U.S. Pat. Nos. 2,983,949 and 2,984,574 among others.

"Large size food casings", the common designation for casings used in the preparation of generally larger food products, such as salami and bologna sausages, meat loaves, cooked and smoked ham butts and the like, are produced in stuffed diameter sizes of from about 50 mm to about 200 mm or even larger. In general, such casings have a wall thickness about three times greater than "small size casings" wall thickness and are provided with a fibrous web reinforcement embedded in the wall, though they may be prepared without such supporting medium. For many years the large size tubular casings have been supplied to the food processor in flattened condition, cut to predetermined lengths of from about 0.6 m to about 2.2 m. More recently, however, but prior to the time of this invention, large size casings of both the fibrous and the unsupported types have been and are being supplied in the form of shirred sticks containing up to about 65 m of casings.

"Chub size food casings" constitutes a range of intermediate casing sizes with stuffed diameters of from about 38 mm to about 99 mm, sizes which overlap into both the aforedescribe small food casings and large size food casings size ranges but falling, in the main, in the large size food casings designation and description. The description of the large size food casings is therefore most generally applicable to the chub size food casings, the casings with which the present invention is principally concerned.

CASING MOISTURE CONTENT

In the preparation and use of cellulosic food casings, control of the moisture content of the casings is of importance.

When small size cellulosic casings are produced, it is generally necessary that they nave a water content in the range of about 14% to about 18% by weight of total casing to enable stuffing operations to be carried out without damage to the casings. This relatively narrow range of moisture content is also important because excessive breakage of the casing during stuffing has been found to occur at lower moisture contents, while greater moisture content results in excessive plasticity of the casing material and consequent overstuffing.

The large size casings as described hereinabove have recently been improved to the extent that shirred and compacted casings lengths are available in premoisturized or presoaked condition so that the long used and troublesome step of soaking such casings immediately prior to the stuffing operation has now been eliminated. The moisture contents of the larger size casings of the fibrous reinforced variety, when they are furnished in shirred and premoisturized condition, is usually found to be in the range of from about 16% to about 35% moisture by total casing weight.

THE SHIRRING PROCESS

Shirring techniques for the casings described hereinabove in accordance with patent references noted, as well as with others, can be generally described as involving the continuous feeding of a length of flat casing feed stock, from a reel for instance, into a shirring machine where it is inflated with low pressure gas, usually air. The inflated casing is passed through an array of shirring rolls which pleat the casing up against a restraint on or about the snirring mandrel until a preselected shirred length has been attained. For a floating mandrel type of shirring machine, such as described in U.S. Pat. No. 3,766,603 for example, the shirred casing is then transferred linearly past or away from the restraint against which the snirring was performed and onto an extended mandrel portion whereon it is compacted into a desired stick length. For a withdrawing mandrel shirring machine such as described in U.S. Pat. No. 2,583,654 for example, the shirring mandrel with the shirred casing remaining thereon is rotated to an alternate position where the shirred casing is compacted to the desired stick length. The normal compaction results in a stick length which may be from about 1 percent to about 1.2 or 1.3 percent of the original casing length. The United States Patent to Hewitt, U.S. Pat. No. 2,001,461, for instance, describes how an original casing length of 396 inches (1006 cm) is reduced to a length of less than four inches (10 cm) in stick form and further indicates that the lowest practical limit probably attainable with regard to the ratio of stick length to original casing length is probably in the neighborhood of one hundred thirtieth, (1/130).

The ratios of original casing length to shirred stick length have been generally in the order of 70 to 100 throughout the industry, prior to the time of the present invention. This ratio is referred to as the "pack ratio" and is the reciprocal of the ratio discussed by Hewitt.

Packing efficiency is another way of quantitatively expressing the extent to which original casing lengths are compacted in the shirred stick form. Packing efficiency is defined as the ratio of the volume of the shirred and compacted casing in a unit length divided by the volume of the same unit length which would be occupied by solid casing material, and it may be determined by the following relationship:

$$PE = \frac{L_c \times (2 \times FW \times t_c)}{\frac{\pi}{4}(OD^2 - ID^2) \times L_s}$$

where
$PE$ = Packing Efficiency
$L_c$ = casing length
$L_s$ = shirred casing stick length
$FW$ = casing flat width
$t_c$ = casing wall thickness
$OD$ = shirred casing stick outer diameter
$ID$ = shirred casing stick inner diameter Inspection of the relationship shows that the ratio is actually the volume of the casing flat stock which is contained in the shirred casing stick, divided by the wall volume of a hollow cylinder having the same dimensions as the shirred casing stick. The extent to which packing efficiency increases is thus measured by the closeness of its approach towards one (1), unity.

The goals that have been sought in shirring technology have been to produce a casing stick which can be deshirred and stuffed on a stuffing apparatus, continuously, with no mechanical defects or breakdowns so as to insure continuous production, the stick itself having sufficient structural and mechanical integrity to withstand the ordinary rigors of packaging, storage, handling, and placement on the stuffing apparatus, and, in addition, the desideratum of compacting as much stuffable casing into a given stick length a is technically feasible.

By way of illustration, a typical prior art packing efficiency may be calculated from the teachings of U.S. Pat. No. 3,528,825 to Doughty. Referring to column 5, line 75 through col. 6. line 5, we find the description of a shirred casing stick in which 95 feet (30 meters) of casing having an inflated outside diameter of 22/32 inch (1.75 cm) with a wall thickness of 0.001 inch (0.0254 mm) is shirred into a stick having an O.D. of ⅞ inch (2.22 cm), an I.D. of ½ inch (1.27 cm), and a stick length of 16¼ inches (41.28 cm). Using those data and the above formula for Packing Efficiency, it will be found that the prior art casing illustrated in Doughty has a packing efficiency of 0.374. The pack ratio of this prior art casing was 70; 95 feet (30 meters) shirred and compacted to 16¼ inches (41.28 cm).

THE STUFFING APPARATUS & CLIP CLOSURES

The intermediate or chub size casings comprehended by the present invention can be stuffed with food emulsion on stuffing machines such as the SHIRMATIC ® (Registered Trademark of Union Carbide Corporation) automatic sizing-stuffing apparatus described in U.S. Pat. Re No. 30,390, for instance, or on similar commercially available stuffing apparatus fitted with suitably sized stuffing horns. In handling chub size casings in the stuffing operation, auxiliary apparatus to apply the closure clips to the stuffed casing is customarily used. An automatic double clipper which is widely used with chub size stuffing apparatus applies two closure clips simultaneously to the casing material between the discrete food product lengths or links. Various gauge clips can be applied, depending on the weights and viscosities of the product being stuffed. Gathering and clipping the casing at high speed, particularly with the use of the advantageous controllably moisturized casings discussed hereinabove, requires that some casing slack be provided in order to not tear or unduly stretch the casing material, or to not overpressurize a stuffed product length and blow out the other clip closed end. Towards this end, that is to say, the provision of slack casing to facilitate the clipping closure operation, an invention which is the subject of application Ser. No. 273,278, now U.S. Pat. No. 4,438,545 and assigned to the same assignee as is this application, provides for a casing slackening and gathering technique and apparatus which requires the reciprocal longitudinal movement of a casing carrier tension sleeve on the stuffing apparatus.

The present invention provides, as an element in the claimed combination of this application, the tension sleeve which is operably connectable to the slackening apparatus described in the aforesaid U.S. Pat. No. 4,438,545.

BRIEF DESCRIPTION OF THE INVENTION

With this then being the state of the art, the present invention was conceived and developed to provide a shirred casing stick tension sleeve unitary article comprising a central substantially rigid hollow tension sleeve core with casing shirred and compressed thereon to a higher packing efficiency than heretofore attained in the art and with means provided on the tension sleeve to operably connect it to a slackening mechanism on a stuffing machine.

It is a principal object of the present invention to provide a high density shirred casing stick tension sleeve article of a type which is particularly useful in conjunction with automatic food stuffing machinery to make chub size food articles.

It is a further object of the invention to provide for the fabrication of cored high density shirred casing stick tension sleeve articles on presently available casing shirring machinery with only slight, if any, modifications thereto in order to produce articles according to the invention.

An important and particular object of the invention is to provide a high density shirred casing stick wherein the core itself becomes an element of a stuffing system in which it is incorporated, specifically a reciprocally movable tension sleeve on a chub size automatic stuffing apparatus. It should be noted however, in this connection, that the slackening-clipping method and apparatus improvements on stuffing techniques for chub size products is considered to be a separate invention, the invention in this present case being only a specific adaptation of the cored high density concept to such techniques. It should be further noted that such improvements are the subject matter of application Ser. No. 273,278 now U.S. Pat. No. 4,438,545 and assigned to the same assignee.

It is also to be noted in connection with this invention, that the cored high density shirring concept itself is a separate invention and is the subject of application Ser. No. 261,304 filed in the United States Patent and Trademark Office May. 1981, now abandoned and the subject matter of which is now part of a continuation-in-part application Ser. No. 363,851, filed Apr. 5, 1982 now abandoned.

An additional particular object of the invention is to provide a tension sleeve cored high density shirred casing stick article, provided in combination with a sizing means of one type or another mounted on the tension sleeve of the article and disposed internally of an unshirred portion of the shirred casing.

In general, the invention comprehends the combination of a substantially rigid tubular casing carrier tension sleeve; means at one end of said tension sleeve for connecting said tension sleeve to a reciprocally operable slacker mechanism on a stuffing apparatus; a controllably moisturized cellulosic food casing length having a moisture content of from about 16 percent to about 35 percent by total casing weight, shirred and compacted on said core to a packing efficiency greater than the packing efficiency of said same casing length shirred and compacted under the same shirring and compacting conditions without said core, said core having an outer circumference greater than the inner bore circumference the sam casing would nave when shirred and compacted under the same shirring and compacting conditions without said core; and casing sizing means mounted on said tension sleeve, disposed interiorly of an unshirred portion of said shirred casing length.

It has been found advantageous in practicing the invention to keep the packing efficiency at 0.50 and higher.

The substantially rigid tubular tension sleeve core element of an article according to the invention may vary in wall thickness to suit the particular casing article and its adaptation and utilization, and further in accordance with the core material used, but, in general, it may be stated that the wall thickness of such tension sleeve is generally in the range of from about 0.040 inch (0.10 cm.) to about 0.060 inch (0.15 cm.).

The means at one end of the tension sleeve for connecting the tension sleeve to a reciprocally operable slacker mechanism on a stuffing apparatus may advantageously comprise an annular flange extending radially outward from the tubular surface of the tension sleeve.

In an alternative more specifically detailed embodiment of the invention, the tension sleeve flange is provided with a shoulder element disposed between the end of the compacted casing and a facia surface of the flange. The shoulder means is designed to provide a space between the compacted end of the casing and the flange facia surface which facilitates the operable connection of a slacker mechanism on a stuffing apparant The sizing means provided in an article according to the invention may be a sizing disc, most preferably with a circumferential rim.

The preferred antimycotic agent, if one is used, is a chloride salt selected from the group consisting of sodium chloride, magnesium chloride, ammonium chloride, calcium chloride, and potassium chloride. With respect to the use of chloride salts as antimycotic agents, it should be noted that this is the subject of a separate application Ser. No. 130,190 filed Mar. 3, 1980 and assigned to the same assignee as is this application now abandoned.

DETAILED DESCRIPTION OF THE INVENTION

The invention will now be described in greater particularity and with references to the single figure drawing appended to this specification which is an isometric view of an particle embodiment according to the invention wherein the tension sleeve core element is used as a casing carrier to be slipped over a stuffing horn and attached to a slacker mechanism on a stuffing machine.

Referring to the drawing, the illustrated embodiment of the invention comprises a rigid tubular casing carrier core or tension sleeve 11 provided at one end with a flange 13 for connecting the tension sleeve to a reciprocally moveable slacker mechanism 15 on a stuffing machine which, except for the slacker mechanism, is not otherwise shown.

A casing 17 length, shirred and compacted to a high density condition is disposed on the tension sleeve 11 with one end continuous to the flange 13 and the other end partially deshirred, pulled over a sizing disc 19, the unflanged end 21 of tension sleeve 11 and closed with a clip 23. The shirring and compaction of the casing 17 is accomplished in accordance with the description provided in application Ser. No. 261,304, mentioned hereinabove, and the teaching of that application, with regard to cored high density shirring.

As mentioned in Ser. No. 261, 304 shirred casing sticks, immediately after they are doffed from the shirring and/or compacting mandrel, tend to evince growth, which is the tendency of an unrestrained, shirred and compacted stick to elongate. In the case of uncored shirred and compacted sticks, there is the further growth of the pleated casing inwardly of the bore of the stick, a phenomenon which is increased in proportion to the extent to which longitudinal stick growth may be restrained.

With cored high density shirring, bore inward growth is, of course, greatly reduced. The tendency of a shirred and compacted stick to grow radially inward against the core, however, to the extent that it is still very much in existence in casing articles according to cored high density shirring, produces an added locking effect of the casing pleats against the core outer surface.

Sizing disc 19, as shown, is an annular cup-shaped disc mounted as shown in the drawing on tension sleeve 11 with a leg portion 25 extending outward radially from the outer surface of the tubular tension sleeve 11 to a circumferential rim 27 over which the deshirred portion of casing 17 is pulled.

In order to accommodate and facilitate connection of the tension sleeve 11 flange 13 to the slacker mechanism 15, a shoulder element 29 may advantageously be arranged and disposed between the end 31 of the shirred and compacted casing 17 and facia surface 33 of flange 13. The criterion for such an arrangement or any equivalent thereof is that the casing material be maintained clear and free of any possibly damaging contact with the slacker mechanism 15.

Example I

Intermediate size fibrous casings according to the present invention may be prepared on tubular tension sleeve cores of high density polyethylene for use on stuffing machines to make medium size sausage products in accordance with the following table, Table 1:

TABLE 1

| Casing Size | Casing Nominal Inflated Diameter Inches | Core Tube Outside Diameter Inches | Casing Pack Ratio Feet/Feet | Casing Packing Efficiency | |
|---|---|---|---|---|---|
| | | | | Cored | Uncored |
| 43 | 1.48 | 1.230 | 52 | 0.500 | 0.421 |
| 47 | 1.589 | 1.230 | 74 | 0.500 | 0.444 |
| 50 | 1.679 | 1.230 | 96 | 0.500 | 0.458 |
| 55 | 1.846 | 1.230 | 126 | 0.500 | 0.468 |
| 58 | 1.958 | 1.230 | 149 | 0.500 | 0.476 |
| 60 | 2.063 | 1.230 | 170 | 0.500 | 0.479 |
| 65 | 2.184 | 1.713 | 97 | 0.500 | 0.439 |
| 70 | 2.387 | 1.713 | 139 | 0.500 | 0.461 |
| 75 | 2.582 | 1.713 | 178 | 0.500 | 0.470 |
| 80 | 2.773 | 1.713 | 217 | 0.500 | 0.478 |
| 90 | 3.139 | 1.713 | 290 | 0.500 | 0.484 |
| 95 | 3.349 | 1.713 | 332 | 0.500 | 0.487 |
| 100 | 3.502 | 1.713 | 359 | 0.500 | 0.488 |
| 110 | 3.775 | 1.713 | 286 | 0.500 | 0.491 |

The casing wall thickness for the sizes 43 through 100 is 0.0024 inch, and for size 110, 0.0035 inch. The tension sleeve core tube wall thickness is 0.050 inch and the packing efficiency is 0.50 in all cases for the cored samples. The packing efficiency as indicated in the last column is for uncored samples shirred and compacted under the sam respective conditions and to the same respective pack ratios, but without any core.

EXAMPLE II

Although the principal application of the invention is in the manufacture of the intermediate or chub size sausage products, the invention is as readily adaptable to and suitable for the manufacture of large size stuffed food products where tension sleeve operation is called for.

Large size fibrous casing articles according to the present invention for use on large product stuffing machines, such as described in U.S. Pat. No. Re. 30,390, for instance, and in any others where the aforedescribed tension sleeve operation is involved in the process, can be made up on high density polyethylene tubular cores in accordance with the following table, Table 2:

TABLE 2

| Casing Size | Casing Nominal Inflated Diameter Inches | Core Tube Outside Diameter Inches | Casing Pack Ratio Feet/Feet | Casing Packing Efficiency | |
|---|---|---|---|---|---|
| | | | | Cored | Uncored |
| 9 | 4.402 | 3.562 | 104 | 0.500 | 0.429 |
| 9½ | 4.660 | 3.562 | 136 | 0.500 | 0.447 |
| 10 | 4.807 | 3.562 | 154 | 0.500 | 0.454 |
| 11 | 5.278 | 4.250 | 127 | 0.500 | 0.430 |
| 12 | 5.768 | 4.250 | 187 | 0.500 | 0.454 |

The casing wall thickness is 0.004 inch for all of the tabulated sizes, the tension sleeve core tube wall thickness is 0.062 inch and the packing efficiency is 0.50 in all cases for the cored samples. The packing efficiency as indicated in the last column is for uncored samples shirred and compacted under the same respective conditions and to the respective pack ratios, but without any core.

Experimental work described in the hereinabove mentioned application Serial No. 261,304 indicates that the high density polyethylene tension sleeve wall thickness for articles according to the invention should be in the range of from about 0.040 inch (0.10 cm) to about 0.060 inch (0.15 cm).

Tension sleeves made of ABS, an acrylonitrilebutadiene-styrene copolymer tubing, work satisfactorily at somewhat lower wall thickness than the high density polyethylene tension sleeve cores.

Polyvinyl chloride tension sleeves are considered unsatisfactory because of very high friction between the casing and the tension sleeve core elements.

The selection of tension sleeve core material for the present invention will be a matter of economics and design choice, the principal design factor to be considered being choice of a core wall thickness, a strength, and a modulus of elasticity according to the material selected, adequate to resist the casing expansion forces which tend to distort and reduce the tension sleeve core bore size.

The invention then, as hereinabove described, provides a significant advance in the art. More shirred casing in a given stick length makes for longer continuous production runs. The use of premoisturized or controllably moisturized casing is very important in combination with the other elements of the invention, since with prestuffing soaking eliminated, there is no need to provide interpleat interstices to facilitate soaking, and the casings can be tightly compacted to the high density condition according to the invention.

Embodiments of the invention other than those described hereinabove, but within the spirit and scope of the invention, may, in the light of this disclosure, occur to persons familiar with the art. It is intended, therefore, that the foregoing description of the invention be construed as illustrative only and not in any limiting sense, the invention being properly defined and limited by the appended claims.

What is claimed is:

1. A shirred casing stick tension sleeve article comprising in combination:
   (a) a substantially straight, rigid hollow tubular tension sleeve core member having a bore size sufficient to slidably fit over the stuffing horn of a stuffing apparatus;
   (b) a radially extending flange provided at one end of said tubular core member for connection to a reciprocally operable slacker mechanism of the stuffing apparatus;

(c) a casing sizing means on a second end of said tubular core member;

(d) a shirred and longitudinally compacted controllably moisturized cellulosic food casing disposed on said tubular core member, said casing having a packing efficiency of at least about 0.50 and a moisture content of from about 16% to about 35% by total casing weight, said compacted casing having one end contiguous to said flange and a deshirred portion at a second end extending over said sizing means;

(e) said tubular coro member being sufficiently rigid to resist inward growth of the compacted casing disposed thereon; and (f) said flange is provided with a shoulder element disposed between said compacted casing and a facia surface of said flange, said shoulder element providing a space between the compacted casing and said facia surface of said flange to accommodate the operable connection of said flange to the slacker mechanism of the stuffing apparatus.

2. A casing article according to claim 1 wherein the casing inflated diameter is a size of from about 1.5 inches (3.8 cm) to about 3.9 inches (9.9 cm), the outside diameter of the rigid tubular tension sleeve core member is from about 1.0 inches (2.54 cm) to about 2.0 inches (5.08 cm), and said compacted casing has a pack ratio of unshirred to shirred length of casing of from about 50 to about 360.

3. A casing article according to claim 2 wherein the rigid tubular tension sleeve core member has a wall thickness of from about 0.040 inch (0.10 cm) to about 0.060 inch (0.15 cm).

4. A casing article according to claim 1 wherein the inflated diameter of said casing is from 4.0 inches (10.2 cm) to about 6.00 inches (13.44 cm), the outside diameter of the rigid tubular tension sleeve core member is from about 3.5 inches (9.1 cm) to about 4.3 inches (10.9 cm), and said compacted casing has a pack ratio of unshirred casing length to shirred casing length of from about 100 to about 190.

5. A casing article according to claim 4 wherein the wall thickness of said rigid tubular tension sleeve core member is from about 0.050 inches (0.127 cm) to about 0.075 inches (0.19 cm).

* * * * *